E. Greenlee,
Making Barrel Heads.
No. 43,985. Patented Aug. 26, 1864.
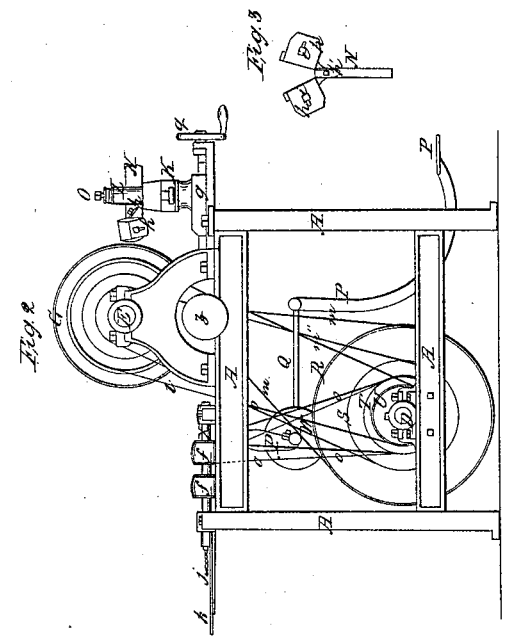
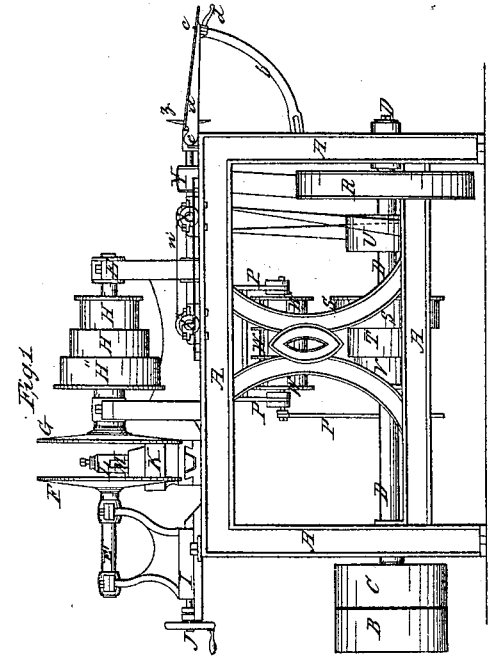
Witnesses
F. Shattuck
Wm McLaughlin
Inventor.
Edward Greenlee

UNITED STATES PATENT OFFICE.

EDMUND GREENLEE, OF SUMMERHILL, PENNSYLVANIA.

IMPROVEMENT IN MACHINES FOR MAKING HEADS TO BARRELS.

Specification forming part of Letters Patent No. 43,985, dated August 30, 1864; antedated August 1, 1864.

*To all whom it may concern:*

Be it known that I, EDMUND GREENLEE, of the township of Summerhill, county of Crawford, and State of Pennsylvania, have invented a new and useful improvement in machinery for doweling, rounding, and finishing headings and bottoms for cooper-ware generally; and I do hereby declare that the following is a full, clear, and exact description of the construction and operation of the same.

Figure 1 is a side view. Fig. 2 is an end view; Fig. 3, a vertical view of the tool for dressing the edge of the heading.

Like letters refer to like parts.

A is the frame; B, loose pulley on which the power-belt runs when the machine is at rest; C, pulley to which the power is applied; D, counter-shaft; E E, revolving mandrels; F G, face-plate on revolving mandrel; H H H, pulleys on revolving mandrel E; I, bearing or support of mandrel E; J, tail-screw by which mandrel E and face plate F may be adjusted nearer to or farther from face-plate G; K, slide-block on which tool-post L stands; M, mortise in tool-post in which the tool N is inserted when the machine is in operation; O, screw by which tool N is fastened; P, treadle for operating tightening-pulley W; Q, rod connecting treadle P with tightening-pulley frame P; R, driving-pulley for giving motion and power to concave circular saw Y Z. S T V are three pulleys of different sizes, by which different motion can be given to mandrels E' E and face plates E and G; U, pulley giving motion and power to doweling-bits $f j x$; W, tightening-pulleys to tighten the belt running on pulleys S T V H H H; $a$, table on which the head is placed to round it with concave circular saw Z; $b$, adjustable support to table $a$, by which the inclination of table $a$ may be varied; $c$, pivot or center pin on which the center of the head is placed and retained during the rounding process; $d$, device by which the center-pin may be moved nearer to or farther from the circular saw Z, so that a head may be rounded of a larger or smaller diameter; $e$, hinge of the table $a$; $g$, base of slide-block K; $h$ $h$ $h'$, bits or cutters in tool N; $i$, screws by which the cutters $h$ $h$ $h'$ are retained in their proper places; $k$, table on which the heading is placed and held while being bored for doweling; $l$ $m''$, belt from pulley V to pulley H''; $m$, belt from R to pulley Y, giving motion to concave circular saw Z; $o$, belt from pulley U to pulley $f$, giving motion to doweling-bits; $n$, belt reciprocating motion to the second doweling-bit $x$.

The manner of operating this machine is as follows: To bore the heading for doweling, place the heading, one piece at a time, on the table $k$, then with the hands push the head against the doweling-bits $j$ until the holes are bored the required depth. The head is then pinned together and then put on the rounding-table $a$, with its center forced upon center-pin $c$, then with one hand resting on the head to keep it firm upon the center-pin $c$, with the other hand turn the head, and as it revolves the concave circular saw Z will round it. The head is then taken and put between the face-plates F G, and the face-plate F forced against it by means of tail screw J, so that it is sufficiently tight to admit of having its edges turned off to the required shape. The operator then puts his foot upon the treadle P, which tightens the belt $l$ $m''$ by bringing the tightening-pulley W in contact with it, and gives motion to the mandrels E E and the head between face-plates F G. The tool N is brought in contact with the edge of the heading by means of the tail-screw $q$.

The machine will make all heads and bottoms of the same size, according to the size for which the machine has been regulated to make. The tool N (shown in a separate section in the drawings) has a bit in each jaw, and one at the base or side of the others, so that while the bits at the side shall reduce the edges the head of the bit that lies between them shall truly round the face of the edge of the head. It is obvious that these bits can be made to be adjusted at any angle desired for the sides or face of the head, and that the cutters can be held in place by wedges, as in the face-plane, or by screws, if desired, when, of course, the depth of cut can be regulated at pleasure.

Having thus described the construction and operation of my improved machine, what I claim therein as new, and desire to secure by Letters Patent of the United States, is—

The tool N, when constructed, arranged, and operating in the manner described, for the purpose set forth.

In testimony whereof I have hereunto subscribed my name.

EDMUND GREENLEE.

Witnesses:
 M. BYLLESBY,
 R. S. GREENLEE.